Dec. 19, 1961     L. EULER     3,013,543
POWER PLANT

Filed Jan. 26, 1959     4 Sheets-Sheet 1

INVENTOR.
L. EULER

BY

ATTORNEYS

INVENTOR.
L. EULER
ATTORNEYS

Dec. 19, 1961    L. EULER    3,013,543
POWER PLANT
Filed Jan. 26, 1959    4 Sheets-Sheet 4

INVENTOR.
L. EULER
BY
ATTORNEYS 3,013,543
POWER PLANT
Luis Euler, Tanques de Palatino, Cerro, Havana, Cuba, assignor of one-half to Tomas Galdos, Havana, Cuba
Filed Jan. 26, 1959, Ser. No. 788,996
2 Claims. (Cl. 123—65)

My invention relates to internal combustion motors for general service, and more particularly to an internal combustion motor for use as a power plant for self-propelled vehicles.

Broadly, the invention relates to a two stroke, high speed, high compression, spark ignition motor having its crankshaft directly connected to a turbine provided with an automatic shut-off valve, jointly cooperating with the motor to increase its efficiency and improve its operating characteristics.

One of the objects of the invention is to provide a two stroke motor in which a portion of the available heat energy of the combustion gases is converted into kinetic energy by the expansion of said gases when passing through the exhaust port of the motor, which port is formed as a suitable shaped passage, or as a nozzle, from which it issues as a jet properly directed against curved or inclined blades mounted on a revolving disc, converting a part of kinetic energy into mechanical energy of shaftwork, with the exhaust port being uncovered by the piston on its downstroke when the high pressure of the combustion gases within the cylinder is no longer capable of producing appreciable torque due to the small angle of thrust from the piston, whereby the potential energy of the combustion gases which otherwise could not be employed is here advantageously converted by the turbine into additional motive power.

Other objects and advantages of this invention including details of construction will be made clear from the following description and accompanying drawings and in which drawings.

FIGURE 3, 4, 5, and 6 show a fragmentary cross-sectional view of the cylinder illustrating the direction of the gases at different piston positions.

Figure 2:
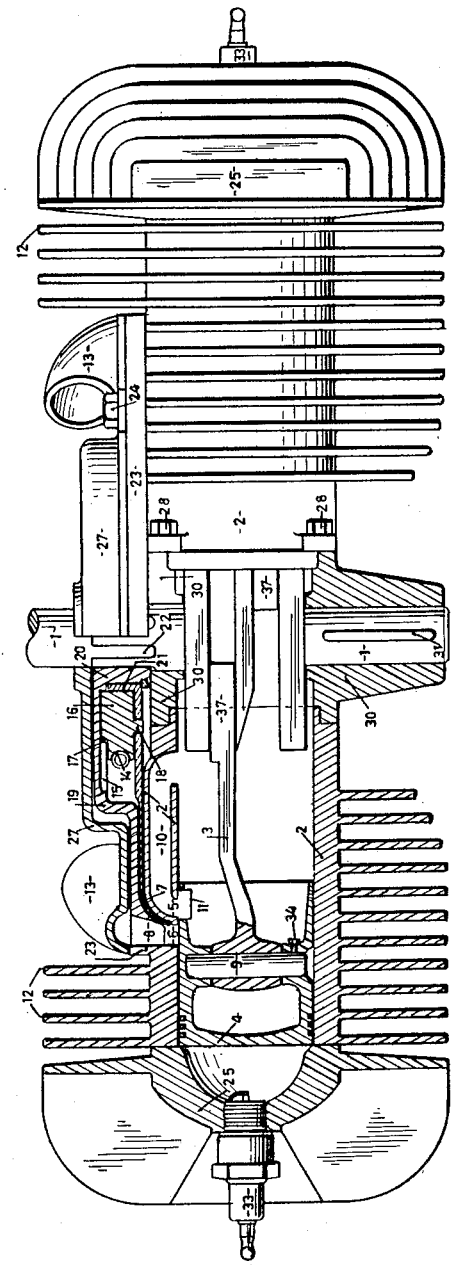
FIGURE 2 is a further view of the motor showing a cross-section of a cylinder and part of the crankcase taken along the crankshaft.
Figure 7:
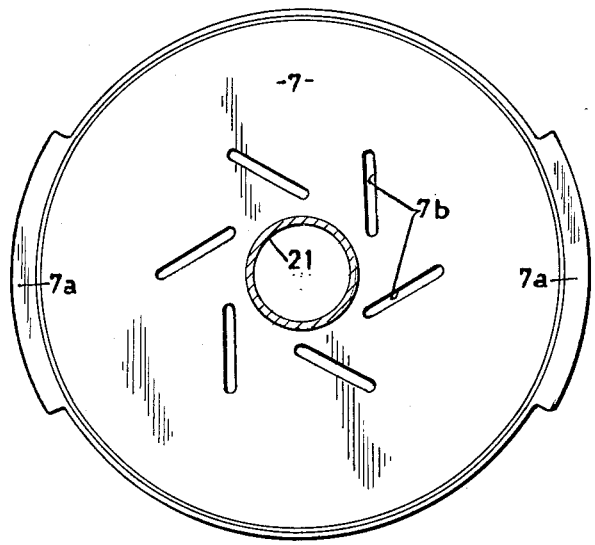
Figure 8:
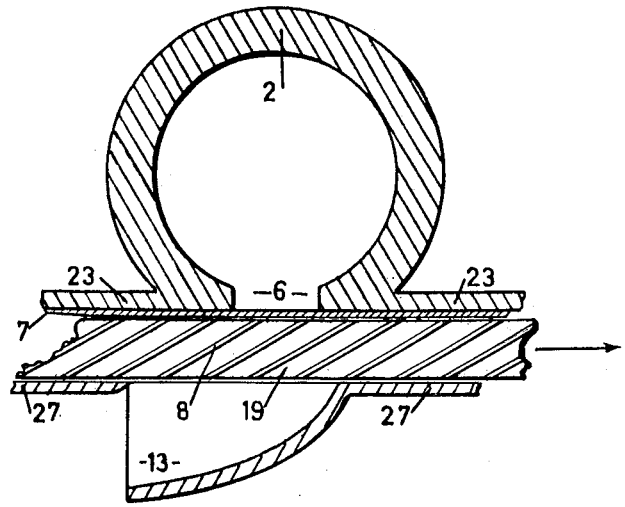

FIGURE 7 is a view showing an embodiment of the shut-off valve on a reduced scale, and FIGURE 8 shows a fragmentary view in a circumferential cross-section of the cylinder taken along line A—A in FIGURE 2.

Referring to the drawings, an opposed two cylinder motor of the air cooled type is shown in which the carburation and ignition systems are omitted to avoid confusion since they are not essential for the full and complete understanding of the operation of the motor.

Cylinder heads 25 are securely fastened to the upper parts of cylinders 2 and crankcase 30 is solidly bolted to the lower parts of the cylinders by means of bolts 28 and the crankcase carries crankshaft 1. Flat headed pistons 4 are of conventional type and are connected to the crankshaft 1 at 37 by means of connecting rods 3. Forked connecting rods or bent as shown in FIG. 2, are used because the cylinders 2 must be in axial alignment.

Each half of a turbine casing 23 is integrally cast with the corresponding cylinder 2. A cover plate 27 containing exhaust stacks 13 is fastened to the casings 23 by means of bolts 24. A transfer port hole 5 is located at the lower part of the cylinder 2 facing the power take-off end side of the crankshaft 1 and is completely uncovered by the piston 4 when the piston 4 reaches its lower dead center. An exhaust port hole 6 is located immediately above the transfer port hole 5 and also faces the same cylinder side as shown in FIG. 2. A turbine wheel 19 has a hub 20 at its center splined to the crankshaft 1 for rotation therewith and fixed in the axial direction. The turbine wheel 19 carries at its outer periphery, crescent shaped blades 8 which may be inclined or curved and are preferably integrally formed as shown in FIG. 2. A small radial clearance is left between the blades 8 and the casings 23 and a larger clearance space between the blades 8 and the inner upper lateral sides of the casings 23.

A rotary valve comprises a disc 7 and a hub 21 at its center which is freely rotatable about hub 20 of the turbine wheel. The disc 7 has two similarly flanged parts provided at its outer periphery as shown at 7a and a series of inclined slots 7b as indicated in FIG. 7. The width of the flanges 7a is a little less than the clearance space between the blades 8 and the casings 23 so that the flanges pass closely in front of the exhaust port 6 preventing further escape of the gases from within the cylinder.

The centrifugal control mechanism which may be of any conventional type is illustrated herein as comprising a plurality of flyweights 16 disposed between lateral facing surfaces of the turbine wheel 19 and the disc 7. Each of the flyweights 16 has circumferential end notches therein and an expanding type garter spring 14 bears circumferentially on each of said notches and tends to centralize the flyweights 16. Also, each of the flyweights 16 has a rib or projection 17 at one side which fits inside a corresponding lateral groove 15 of the turbine wheel 19. The flyweights 16 will be carried for rotation with the turbine wheel 19 and may be radially displaceable. At the other side of each of the flyweights 16, there is disposed a pin 18 which fits within the slot 7b of the disc 7.

The reference character 31 indicates a narrow rotary shaft valve for induction feeding of the combustible gases into the crankcase, but a rotary disc valve or cylinder ports to be uncovered by the piston may be equally well used for this purpose.

Figure 3:
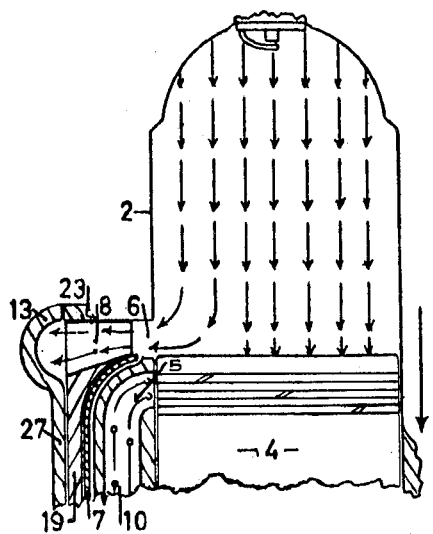

While the operation of the motor is believed apparent from the above, it may be summarized as follows:

Referring to the drawings, FIG. 3 shows the interior of the cylinder at the instant in which the exhaust port 6 has been completely uncovered by the piston 4 while the piston is moving on its downward stroke. The combustion gases escaping through the exhaust port 6 will be directed against the curved or inclined blades 8 of the turbine wheel 19 to produce a rotary force on shaft 1. The velocity of the expanding combustion gases through the exhaust port 6 and impinging against the blades 8 is substantially greater than the peripheral speed of the blades 8. Normally, the section of the exhaust port 6 may be as shown in FIG. 2, but if a greater gas velocity is desired, the exhaust port 6 may be conveniently shaped as a nozzle.

Figure 4:
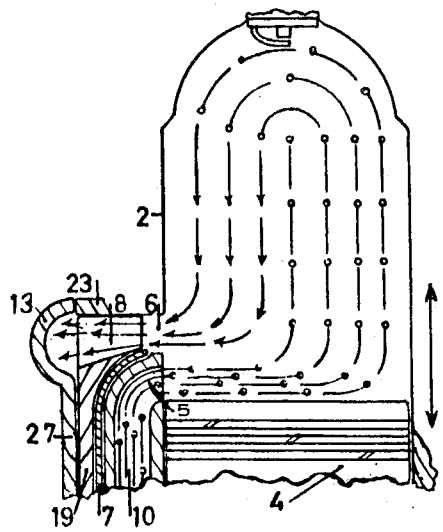

As the piston 4 continues on its downstroke, the transfer port 5 will be also uncovered, and FIG. 4 shows the piston 4 in the lower dead center position with the transfer port 5 being completely uncovered. Since the exhaust port 6 is first uncovered by the piston 4, the pressure drop will be considerable due to the escape of the combustion gases through the exhaust port 6 when the piston 4 uncovers the transfer port 5, so that the back-pressure exerted by the remaining combustion gases upon the combustible gases entering the cylinder will be very small.

Referring again to FIG. 4, it is to be observed that the direction of the combustion gases leaving the cylinder through the exhaust port 6 is opposite to the direction of the precompressed combustible crankcase gases entering the cylinder 2 through the transfer port 5. These combustible gases will sweep over the flat head of the piston 4 and project against the opposite cylinder wall where the combustible gases will be redirected upwardly toward the cylinder head 25 so as to combine the proper scavenging of the combustion gases with the cooling of the piston 4, cylinder 2 and cylinder head 25.

Since the exhaust port 6 and the transfer port 5 are disposed on the same side of the cylinder 2 and are uncovered successively in that order by the piston 4, the upper part or edge of the piston 4 adjacent to the aforementioned cylinder wall side will be subjected first to the heat of the combustion gases as the piston 4 opens the exhaust port 6 but will be immediately cooled by the combustible gases as the piston opens the transfer port 5. Accordingly, an overheating of this part or edge of the piston 4 is not likely to occur even when the motor is allowed to run at high speeds.

Figure 1:
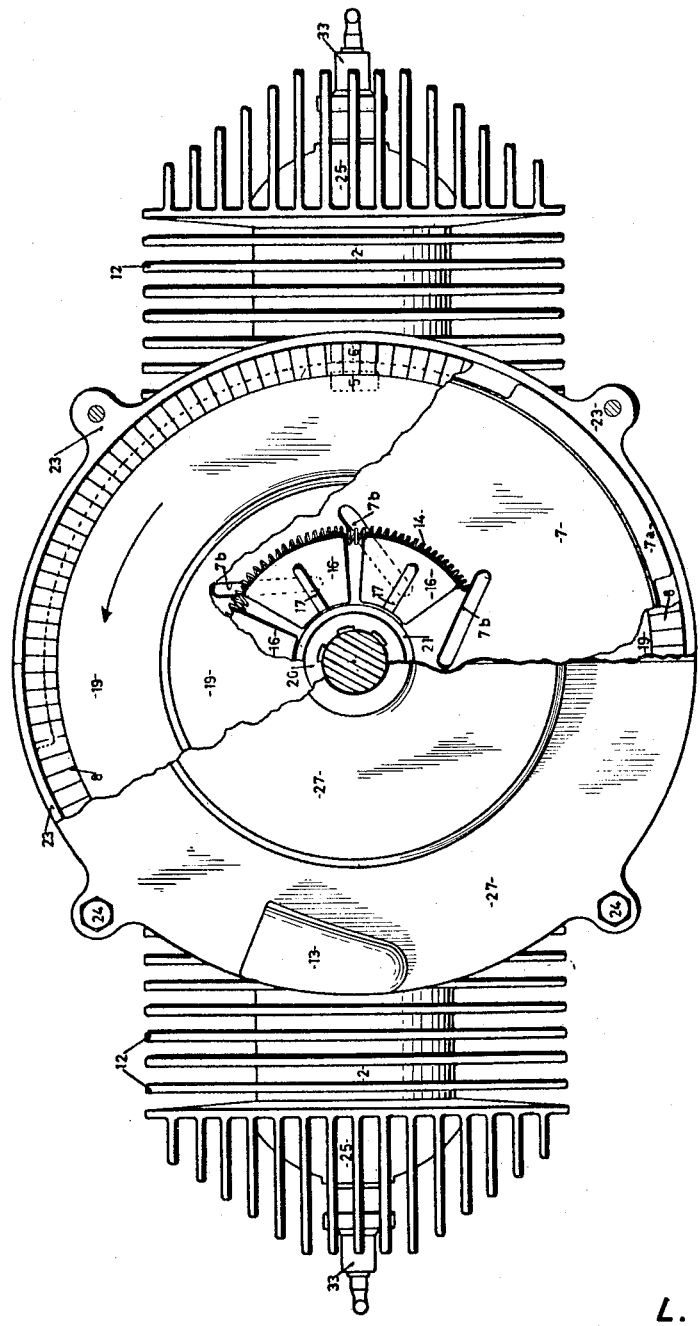
FIGURE 1 is a view of the motor taken from the power take off end side of the shaft showing the turbine with portions thereof broken away to show details of the mechanism.
Figure 5:
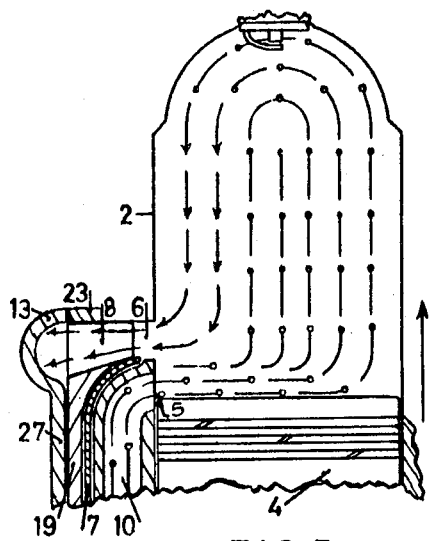
Figure 6:
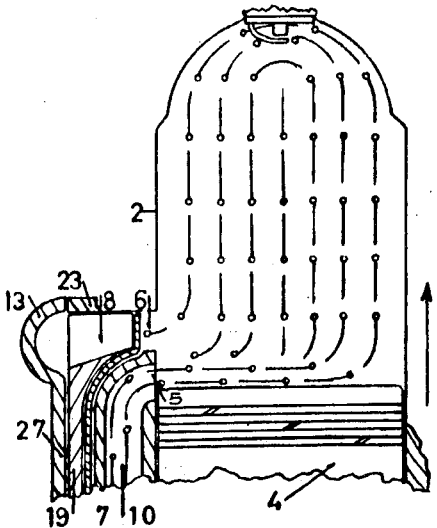

Due to the particular disposition of the exhaust port 6 on the cylinder 2 in this type of motor, the auxiliary shut-off valve 7 is provided to prevent the escape of the combustible gases, by closing momentarily the exhaust port 6 until the piston 4 has moved upwardly sufficiently to cover the same. As the speed of the motor is increased, the combustion gases will be subjected to higher back-pressures, and for this reason, the closing instant of the exhaust port 6 by the auxiliary valve 7 with respect to a determined piston position is made to depend upon the speed of the crankshaft 1 by means of a centrifugal mechanism. If it is assumed that the crankshaft 1 is rotating in a counterclockwise direction when viewed from the power take-off end side and assuming also that the crankshaft 1 is rotating slowly, the flyweights 16 and the auxiliary valve 7 will be in the position shown in FIG. 1. If the motor is accelerated sufficiently, the flyweights 16 will be displaced radially outwards against the action of the spring 14 and the valve 7 will be also displaced angularly relative to the crankshaft 1, since the grooves 7b must follow the tracks of the pins 18. FIGS. 5 and 6 show the interior of the cylinder 2 with the piston 4 in the same position while moving on its upward stroke. FIG. 5 corresponds to the motor running at high speeds showing the exhaust port 6 still uncovered by the auxiliary valve 7 and the combustion gases still evacuating the cylinder 2. The flanges 7a have been displaced angularly in clockwise direction relative to the rotation of the shaft 1 so as to delay the closing of the exhaust port 6. FIG. 6 corresponds to the motor running at slow speeds, showing the exhaust port 6 completely covered by the auxiliary valve 7 after the combustion gases having been completely evacuated. In this case, the flanges 7a have been displaced in counter clockwise direction advancing the closing instant of the exhaust port 6.

In two stroke motors of conventional design, the combustion charge is drawn into the crankcase, precompressed therein and transferred to the cylinder. A very simple and reliable lubrication is therefore possible by mixing the fuel with the lubricating oil in a determined proportion. After gasification of the mixture takes place in the carburator, the combustible gases carry the oil particles to all the inner parts of the motor. When such a motor is running at high speeds, the backpressure exerted at the exhaust port 6 will prevent a complete scavenging of the combustion gases and the combustible gases will be impeded to lubricate adequately the cylinder wall surrounding the exhaust port 6. Therefore, it has been considered necessary to use an excessive oil proportion in the oil-fuel mixture to insure a proper lubrication of this part of the cylinder. In the motor of the present invention, it will be appreciated that the piston part adjacent to the exhaust port is not only efficiently cooled by the combustible gases but is also well lubricated, so that the oil proportion in the oil-fuel mixture may be low.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims, are, therefore, intended to be embraced therein.

What is claimed is:

1. A power plant of the class described, comprising a cylinder, a cylinder head secured at one end of the cylinder, an enclosed piston movable in said cylinder having a power stroke in response to an expanding combustion gas and a compression stroke of a combustible gas, a crankcase secured to the other end of the cylinder, a crankshaft mounted for rotation in said crankcase, linkage means for connecting said crankshaft with said piston, said cylinder having an exhaust port, an automatic acting auxiliary rotary disc valve arranged to pass in close proximity to said exhaust port so as to close momentarily said exhaust port when the expanding combustion gases have been completely expelled from said cylinder until said piston again covers said exhaust port on its compression stroke, and radially displaceable centrifugal means operably associated with one face of said rotary disc valve for advancing or retarding the closing instant of the exhaust port in response to the angular speed of the crankshaft.

2. A power plant as claimed in claim 1, further including expanding spring means operably connected to said centrifugal means normally centralizing said centrifugal means.

References Cited in the file of this patent

UNITED STATES PATENTS

| | | |
|---|---|---|
| 1,376,700 | Johnston | May 3, 1921 |
| 1,689,689 | Ross | Oct. 30, 1928 |
| 1,807,838 | French | June 2, 1931 |
| 1,887,661 | Pielstick | Nov. 15, 1932 |
| 2,055,026 | Cook | Sept. 22, 1936 |
| 2,148,249 | Thomas | Feb. 21, 1939 |
| 2,652,817 | Neugebauer | Sept. 22, 1953 |
| 2,759,464 | Lehner | Aug. 21, 1956 |
| 2,798,466 | Rzepecki | July 9, 1957 |

FOREIGN PATENTS

| | | |
|---|---|---|
| 628,376 | France | June 27, 1927 |
| 917,340 | France | Sept. 9, 1946 |